(12) United States Patent
Takahashi et al.

(10) Patent No.: US 11,196,316 B2
(45) Date of Patent: Dec. 7, 2021

(54) MOTOR AND ELECTRIC POWER STEERING APPARATUS

(71) Applicant: Nidec Corporation, Kyoto (JP)

(72) Inventors: Shunsuke Takahashi, Kyoto (JP); Hiroshi Tange, Kyoto (JP); Yoshiaki Yamashita, Kyoto (JP); Takashi Seguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 166 days.

(21) Appl. No.: 16/487,512

(22) PCT Filed: Mar. 20, 2018

(86) PCT No.: PCT/JP2018/011099
§ 371 (c)(1),
(2) Date: Aug. 21, 2019

(87) PCT Pub. No.: WO2018/180798
PCT Pub. Date: Oct. 4, 2018

(65) Prior Publication Data
US 2020/0059128 A1  Feb. 20, 2020

Related U.S. Application Data

(60) Provisional application No. 62/479,490, filed on Mar. 31, 2017.

(51) Int. Cl.
*H02K 3/52* (2006.01)
*B62D 5/04* (2006.01)

(52) U.S. Cl.
CPC .......... *H02K 3/522* (2013.01); *B62D 5/0424* (2013.01); *H02K 2203/09* (2013.01)

(58) Field of Classification Search
None
See application file for complete search history.

(56) References Cited

U.S. PATENT DOCUMENTS

| 8,922,079 | B2 | 12/2014 | Egami et al. | |
| 8,963,395 | B2* | 2/2015 | Ishino | H02K 3/522 |
| | | | | 310/216.008 |
| 9,000,629 | B2* | 4/2015 | Yokogawa | H02K 15/12 |
| | | | | 310/43 |

(Continued)

FOREIGN PATENT DOCUMENTS

| CN | 101079566 A | 11/2007 |
| CN | 105308833 A | 2/2016 |

(Continued)

OTHER PUBLICATIONS

Official Communication issued in International Patent Application No. PCT/JP2018/011099, dated Jun. 12, 2018.

(Continued)

*Primary Examiner* — Robert W Horn
(74) *Attorney, Agent, or Firm* — Keating & Bennett (57) ABSTRACT

A motor includes a rotor, a stator surrounding an outer side of the rotor in a radial direction and including a coil, and a bus bar of a wire electrically connected to the coil and having conductivity, wherein the stator is provided with a hole extending in an axial direction, the bus bar includes stretched portions extending in the axial direction, and each of the stretched portions is disposed in the hole.

13 Claims, 5 Drawing Sheets

(56) References Cited

U.S. PATENT DOCUMENTS

| | | | |
|---|---|---|---|
| 10,063,120 B2* | 8/2018 | Kawamoto | H02K 3/522 |
| 2007/0273221 A1 | 11/2007 | Kinoshita et al. | |
| 2008/0122301 A1 | 5/2008 | Okada et al. | |
| 2010/0060090 A1* | 3/2010 | Sakata | H02K 3/522 |
| | | | 310/71 |
| 2011/0001388 A1 | 1/2011 | Fujii et al. | |
| 2012/0286593 A1* | 11/2012 | Yokogawa | H02K 3/522 |
| | | | 310/43 |
| 2013/0328425 A1 | 12/2013 | Tomita et al. | |
| 2014/0028127 A1* | 1/2014 | Chamberlin | H02K 5/225 |
| | | | 310/71 |
| 2015/0357878 A1 | 12/2015 | Fukunaga et al. | |
| 2016/0111929 A1* | 4/2016 | Kessler | H02K 3/522 |
| | | | 310/71 |
| 2016/0190887 A1 | 6/2016 | Sambuichi et al. | |
| 2016/0218578 A1* | 7/2016 | Yamada | H02K 15/0068 |
| 2016/0241098 A1* | 8/2016 | Fukunaga | H02K 3/522 |
| 2016/0294240 A1 | 10/2016 | Kawamoto et al. | |
| 2019/0140496 A1* | 5/2019 | Hong | H02K 3/34 |
| 2019/0296597 A1* | 9/2019 | An | H02K 3/34 |
| 2020/0014269 A1* | 1/2020 | Udo | H02K 3/50 |
| 2020/0059126 A1* | 2/2020 | Takahashi | H02K 3/522 |
| 2020/0059128 A1* | 2/2020 | Takahashi | H02K 7/14 |
| 2021/0075289 A1* | 3/2021 | Yada | H02K 3/04 |

FOREIGN PATENT DOCUMENTS

| | | |
|---|---|---|
| DE | 10 2015 001 096 A1 | 9/2016 |
| JP | 2003-134758 A | 5/2003 |
| JP | 2007-174869 A | 7/2007 |
| JP | 2008-022620 A | 1/2008 |
| JP | 2010-011627 A | 1/2010 |
| JP | 2011-091885 A | 5/2011 |
| JP | 2013-042633 A | 2/2013 |
| JP | 2015-122880 A | 7/2015 |
| JP | 2015-142429 A | 8/2015 |
| JP | 2016-013053 A | 1/2016 |
| JP | 2016-039682 A | 3/2016 |
| JP | 2016-096708 A | 5/2016 |
| JP | 2016-174527 A | 9/2016 |
| JP | 5989496 B2 | 9/2016 |
| JP | 2017-011830 A | 1/2017 |
| JP | 2017-042004 A | 2/2017 |
| WO | 2015/151214 A1 | 10/2015 |

OTHER PUBLICATIONS

Takahashi, "Bus Bar Unit and Motor", U.S. Appl. No. 16/487,507, filed Aug. 21, 2019.

Yamashita et al., "Bus Bar Unit and Motor", U.S. Appl. No. 16/487,509, filed Aug. 21, 2019.

Yamashita et al., "Bus Bar Unit and Motor", U.S. Appl. No. 16/487,510, filed Aug. 21, 2019.

Takahashi, "Bus Bar Unit and Motor", U.S. Appl. No. 16/487,513, filed Aug. 21, 2019.

Official Communication issued in corresponding Chinese Patent Application No. 201880022842.3, dated Oct. 12, 2020.

* cited by examiner

MOTOR AND ELECTRIC POWER STEERING APPARATUS

CROSS REFERENCE TO RELATED APPLICATIONS

This is a U.S. national stage of PCT Application No. PCT/JP2018/011099, filed on Mar. 20, 2018, and priority under 35 U.S.C. § 119(a) and 35 U.S.C. § 365(b) is claimed from US Provisional Application No. 62/479,490, filed on Mar. 31, 2017; the entire contents of each application are hereby incorporated herein by reference.

FIELD OF THE INVENTION

The present disclosure relates to a motor and an electric power steering apparatus.

BACKGROUND

Conventionally, a wire is used as a bus bar. For example, a conventional motor has a bus bar of a wire disposed in a groove of a stator.

In the above-described motor, there is a problem that a bus bar is easily detached from a groove. When the bus bar is detached from the groove, the bus bar may not be positioned on a stator.

SUMMARY

Example embodiments of the present disclosure provide motors and electric power steering apparatuses each capable of easily performing positioning of bus bars with respect to a stator.

One aspect of an example embodiment of the present disclosure is a motor including a rotor, a stator surrounding an outer side of the rotor in a radial direction and including a coil, and a bus bar of a wire electrically connected to the coil and having conductivity, wherein the stator is provided with a hole extending in an axial direction, the bus bar includes a stretched portion extending in the axial direction, and the stretched portion is disposed in the hole.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

Further, in the following drawings, the same or corresponding parts are denoted by the same reference numerals, and the description thereof will not be repeated.

Figure 1:
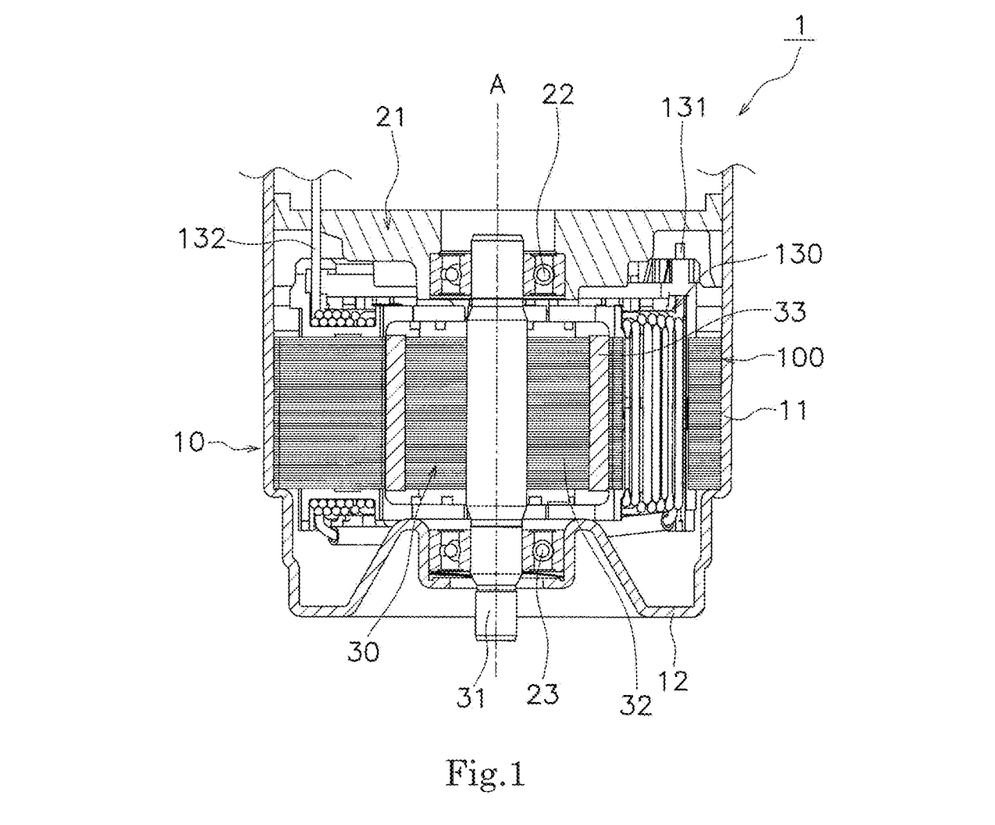
FIG. 1 is a cross-sectional view of a motor according to an example embodiment of the present disclosure.

Further, in the following description, as shown in FIG. 1, when an axial direction in which a central axis A of a rotor 30, that is, a shaft 31 extends is a vertical direction, an opening side of a housing 10 is referred to as an "upper side", and a bottom portion 12 side of a housing is referred to as a "lower side". However, the vertical direction in the present specification is used for specifying the positional relationship, and does not limit the actual direction. That is, a downward direction does not necessarily mean the direction of gravity.

Further, a direction orthogonal to the central axis A of the rotor is referred to as a "radial direction", and the radial direction is centered on the central axis A. A circumference of the central axis A of the rotor is referred to as a "circumferential direction".

Further, in the present specification, the term "extending in the axial direction" includes a state extending in the axial direction strictly and a state extending in a direction inclined in a range of less than 45 degrees with respect to the axial direction. Similarly, in the present specification, the term "extending in the radial direction" includes a state extending in the radial direction strictly and a state extending in a direction inclined in a range of less than 45 degrees with respect to the radial direction.

Motor

A motor, which is an example embodiment of the present disclosure, will be described with reference to FIGS. 1 to 4. As shown in FIG. 1, a motor 1 mainly includes a housing 10, a bearing holder 21, bearings 22 and 23, a rotor 30, a stator 100, and a bus bar 40.

Housing

The housing 10 has a cylindrical shape with a bottom. That is, the housing 10 includes a cylindrical portion 11 and a bottom portion 12. An upper part of the housing 10 is open. The housing 10 accommodates the rotor 30 and the stator 100 therein.

Bearing Holder

The bearing holder 21 is disposed on an upper side of the stator 100 in an axial direction.

Bearing

The bearings 22 and 23 rotatably support a shaft 31 of the rotor 30. The bearing 22 disposed on an upper side in the axial direction is held by the bearing holder 21. The bearing 23 disposed on a lower side in the axial direction is held by the bottom portion 12 of the housing 10.

Rotor

The rotor 30 includes the shaft 31, a rotor core 32, and a magnet 33. The shaft 31 extends in the axial direction along a central axis A. The shaft 31 is supported by a pair of bearings 22 and 23 and rotates about the central axis A.

The rotor core 32 is a laminated steel plate in which a plurality of electromagnetic steel plates are laminated in the axial direction. The rotor core 32 is fixed to the shaft 31 passing through a center of the rotor core 32 and rotates together with the shaft 31. The magnet 33 is fixed to an outer side surface of the rotor core 32 and rotates together with the rotor core 32 and the shaft 31. Thus, the rotor 30 in the present example embodiment is a surface permanent magnet (SPM) type. Further, the rotor 30 may be an interior permanent magnet (IPM) type in which the magnet 33 is embedded in the rotor core 32.

Stator

Configuration of Stator

Figure 2:
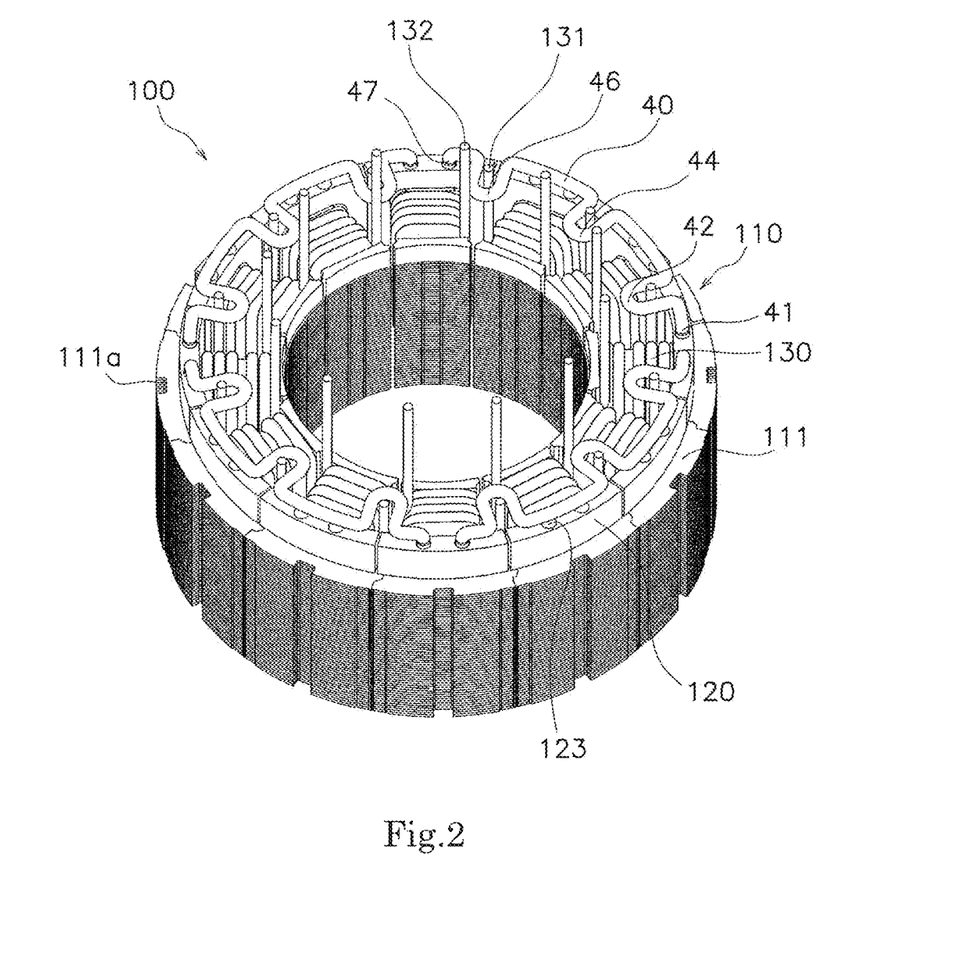
FIG. 2 is a perspective view of a stator and bus bars according to an example embodiment of the present disclosure.

The stator 100 surrounds an outer side of the rotor 30 in a radial direction. As shown in FIGS. 1 and 2, the stator 100 includes a stator core 110, insulators 120, and coils 130.

Stator Core

As shown in FIG. 2, in the stator core 110, a plurality of electromagnetic steel plates are laminated in the axial direction. The plurality of electromagnetic steel plates are fixed by caulking or the like. Further, the stator core 110 may be constituted by one member.

Figure 3:
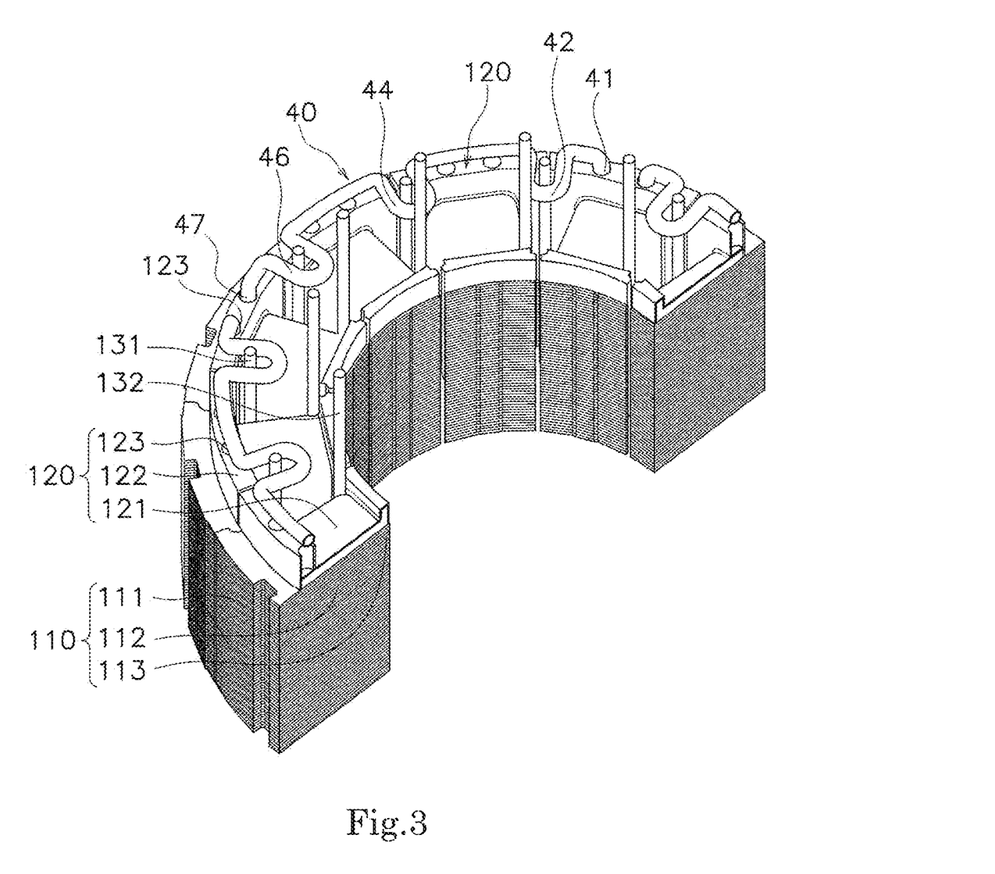
FIG. 3 is a perspective view of a state in which coils are omitted in FIG. 2 and cut in half.

Further, as shown in FIGS. 2 and 3, the stator core 110 of the present example embodiment is constituted by split cores split in a circumferential direction. The split core is one piece in which the stator core 110 is circumferentially split. When the split cores are used, the cores may be assembled after winding the coil wire around the split core. The configuration of the stator core is not limited to the split core and may be a straight core, a round core, or the like.

The stator core 110 includes core backs 111 and teeth 112. One split core includes one core back 111 and one tooth 112.

A plurality of core backs 111 have an annular shape concentric with the central axis A. The core back 111 includes a core back groove 111a that is recessed inward in the radial direction on an outer surface in the radial direction. Each core back groove 111a is located on an outer side of each tooth 112 in the radial direction.

The tooth 112 extends inward in the radial direction from an inner side surface of the core back 111. The teeth 112 are arranged at equal intervals in the circumferential direction on the inner side surface of the core back 111 in the radial direction. The tooth 112 includes an umbrella 113 extending in the circumferential direction on an inner side end in the radial direction.

Insulator

The insulator 120 covers at least a part of the stator core 110. The insulator 120 is attached to each tooth 112. The insulator 120 according to the present example embodiment is constituted by a split body provided on each split core of the stator core 110.

The insulator 120 has insulation properties and is formed of, for example, an insulating material such as an insulating resin.

As shown in FIG. 3, the insulator 120 includes a body portion 121 and a flange portion 122. Each of the plurality of split bodies includes one body portion 121 and one flange portion 122.

The body portion 121 covers the tooth 112. The flange portion 122 protrudes outward in the radial direction from the body portion 121. The flange portion 122 is located on an inner end of the core back 111 in the radial direction. The flange portion 122 extends in the axial direction and the circumferential direction.

The flange portion 122 is provided with a hole 123 extending in the axial direction. The hole 123 is configured such that the bus bar 40 may be inserted from the axial direction. When the hole 123 is formed in the insulator 120, since the insulator 120 has an insulation property, the process for securing the insulation may be omitted.

In addition, since the hole 123 is formed in the flange portion 122, the hole 123 is located on an outer side of the teeth 112 in the radial direction. Thus, the stator 100 having a high space factor of the coil 130 may be realized. Further, the hole 123 may be formed on an inner side of the teeth 112 in the radial direction.

A plurality of holes 123 are formed. The plurality of holes 123 include a hole in which the bus bar 40 to be described below is disposed and a hole in which the bus bar 40 is not disposed. The plurality of holes 123 have the same shape. Further, the shape of the hole 123 is not particularly limited, and the hole 123 may pass through in the axial direction or may be a recessed portion recessed in the axial direction. In FIG. 3, the hole 123 has a circular cross-section, but may have the same outer shape as axially stretched portions 41 and 47.

In FIG. 2, the plurality of holes 123 are formed along the circumferential direction. Thus, the holes 123 may be positioned in the circumferential direction of the bus bar 40.

In the present example embodiment, the holes 123 are formed in each of the split bodies. The number of holes 123 formed in the split body is not particularly limited, but may be two. In this case, since the processing of the holes 123 may be minimized, the cost may be reduced. Two holes 123 in the split body have the same distance from a circumferential edge of the flange portion 122 of the split body.

Coil

As shown in FIG. 2, the coil 130 is configured by winding a coil wire around the tooth 112 through the insulator 120. The coil 130 is configured of a coil corresponding to any one of a U-phase, a V-phase, and a W-phase, and is disposed side by side in the circumferential direction in the order of the U-phase, the V-phase, and the W-phase. The number of coils 130 is twelve, which is the same as the number of teeth 112. Thus, in the present example embodiment, there are four coil sets, each of which includes a U-phase coil, a V-phase coil, and a W-phase coil. Further, the connection method of the coils 130 is a so-called delta connection method.

Two lead wires of a first lead wire 131 and a second lead wire 132 are drawn out upward in the axial direction from each coil 130. Accordingly, the total of the first lead wire 131 and the second lead wire 132 drawn out from each coil 130 is twenty-four.

Bus Bar

Figure 4:
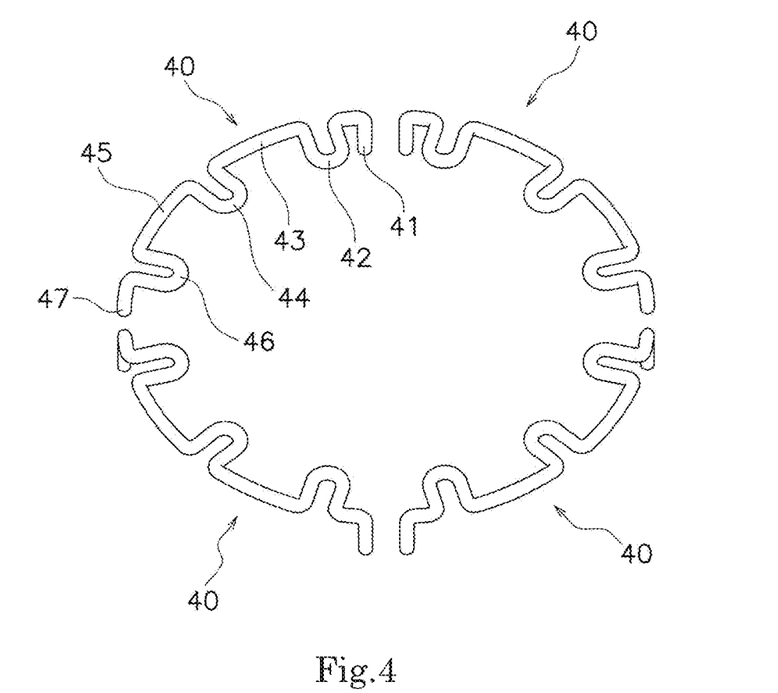
FIG. 4 is a perspective view of bus bars according to an example embodiment of the present disclosure.

As shown in FIG. 2, the bus bar 40 is electrically connected to the coil 130. The bus bar 40 shown in FIGS. 2 to 4 is a neutral point bus bar. The motor 1 includes a plurality of neutral point bus bars, and the motor 1 includes four neutral point bus bars in the present example embodiment. As shown in FIGS. 2 and 3, a plurality of bus bars 40 are arranged side by side in the circumferential direction.

The bus bar 40 is a wire having conductivity. The material of the bus bar 40 is not particularly limited as long as it is conductive, and is, for example, a metal. The bus bar 40 of the present example embodiment is a coil wire (bare wire). Also, the shape of the bus bar 40 is not particularly limited as long as it is a wire, and may be a round wire having a circular cross-section shown in FIG. 4 or a rectangular wire having a rectangular cross-section.

As shown in FIG. 4, the bus bar 40 includes the axially stretched portions 41 and 47, coil connection portions 42, 44, and 46, and circumferentially stretched portions 43 and 45. From one end toward the other end in the circumferential direction, a first axially stretched portion 41, a first coil connection portion 42, a first circumferentially stretched portion 43, a second coil connection portion 44, a second circumferentially stretched portion 45, a third coil connection portion 46, and a second axially stretched portion 47 are located in this order. The bus bar 40, which is composed of the first axially stretched portion 41, the first coil connection portion 42, the first circumferentially stretched portion 43, the second coil connection portion 44, the second circumferentially stretched portion 45, the third coil connection portion 46, and the second axially stretched portion 47, is formed by bending one rod-shaped member.

Specifically, the first axially stretched portion 41 extends downward in the axial direction. The first coil connection portion 42 is connected to an upper end portion of the first axially stretched portion 41 in the axial direction and extended toward the other end in the circumferential direction. The first circumferentially stretched portion 43 is connected to the other end portion of the first coil connection portion 42 in the circumferential direction and extended toward the other end in the circumferential direction. The second coil connection portion 44 is connected to the other end portion of the first circumferentially stretched portion 43 in the circumferential direction and extended toward the other end in the circumferential direction. The second circumferentially stretched portion 45 is connected to the other end portion of the second coil connection portion 44 in the circumferential direction and extended toward the other end in the circumferential direction. The third coil connection portion 46 is connected to the other end portion of the second circumferentially stretched portion 45 in the circumferential direction and extended toward the other end in the circumferential direction. The second axially stretched portion 47 is connected to the third coil connection portion 46 and extended downward in the axial direction.

As shown in FIGS. 2 and 3, the axially stretched portions 41 and 47 are disposed in the holes 123 of the insulator 120, respectively. That is, the axially stretched portions 41 and 47 of the bus bar 40 are disposed in the holes 123 extending in the axial direction of the insulator 120, respectively. Thus, since the axially stretched portions 41 and 47 of the bus bar 40 may be suppressed from being detached from the holes 123 of the insulator 120, the bus bar 40 may be positioned. Accordingly, the bus bar 40 may be easily positioned with respect to the stator 100.

Thus, when the bus bar 40 is easily positioned with respect to the stator 100, the positional accuracy may be enhanced at the time of connecting the coil connection portions 42, 44, and 46 of the bus bar 40 to be described below and the first lead wire 131 of the coil 130. That is, by maintaining the position of the bus bar 40 in the hole 123, connection with the coil 130 is easy.

Gaps may not be formed between the holes 123 and the axially stretched portions 41 and 47, but it is preferable that the gaps are provided. That is, the axially stretched portions 41 and 47 may be press-fitted into the holes 123, but are preferably inserted into the holes 123. Thus, the holes 123 are greater than the axially stretched portions 41 and 47. By forming the gaps, the axially stretched portions 41 and 47 may be passed through the holes 123 by insertion instead of press-fitting. As described above, the axially stretched portions 41 and 47 may be insertion portions capable of being inserted into the holes 123 from the axial direction.

The gaps between the holes 123 and the axially stretched portions 41 and 47 may be small. In this case, since the axially stretched portions 41 and 47 are held at the positions of the holes 123, the positioning accuracy of the bus bar 40 is high.

Each of the axially stretched portions 41 and 47 is disposed in its respective hole 123. Further, two axially stretched portions 41 and 47 may be disposed in one hole 123.

One bus bar 40 includes a plurality of coil connection portions 42, 44, and 46. The coil connection portions 42, 44, and 46 are connected to the coils 130. The number of coil connection portions 42, 44, and 46 is the same as the number of first lead wires 131. In FIG. 2, three coil connection portions 42, 44, and 46 are electrically connected to ends of three first lead wires 131 drawn out from one coil set, that is, the first lead wires 131 of the U-phase, the V-phase, and the W-phase. Thus, the neutral point bus bar 40 connects one coil set to each other to form an electrical neutral point.

The first to third coil connection portions 42, 44, and have a U-shape recessed outward or inward in the radial direction. Thus, the coil connection portions 42, 44, and 46 may sandwich the first lead wires 131 therein. The neutral point bus bar 40 and the first lead wire 131 are electrically connected by laser welding or the like in a state in which the first lead wire 131 is sandwiched in the coil connection portions 42, 44, and 46, and preferably, in a caulked state.

Further, a direction in which the bus bar 40 is inserted into the stator 100 by the hole 123 is the axial direction, and a direction in which the bus bar 40 is brought into contact with the first lead wire 131 by the coil connection portions 42, 44, and 46 is the radial direction. The bus bar 40 is held in the axial direction by the holes 123 and the axially stretched portions 41 and 47 in an outer side in the radial direction, and the bus bar 40 is held in the radial direction by the first lead wires 131 and the coil connection portions 42, 44, and 46 in an inner side in the radial direction. Since the directions are different, the welding is easy, and the bonding strength between the bus bar 40 and the coil 130 is high.

The coil connection portions 42, 44, and 46 may have a recessed shape recessed outward in the radial direction, but the first to third coil connection portions 42, 44, and 46 in FIGS. 2 to 4 are recessed inward in the radial direction. In other words, the first to third coil connection portions 42, 44, and 46 have a U-shape recessed toward a center of the coil 130. Further, in other words, the first to third coil connection portions 42, 44, and 46 have a U-shaped opening directed outward in the radial direction. The size in the radial direction may be suppressed. In addition, when the axially stretched portions 41 and 47 are positioned on an outer side in the radial direction with respect to the teeth 112, the coil connection portions 42, 44, and 46 may be more easily connected to the coils 130, and thus it is particularly preferable. In this case, the bus bar 40 is connected to the coil 130 in the inner side in the radial direction in a state of being positioned in the outer side in the radial direction with respect to the stator by the hole 123.

Further, the coil connection portions 42, 44, and 46 may have a flat plate shape. In this case, the coil connection portions 42, 44, and 46 have a rectangular cross-sectional shape, and portions other than the coil connection portions 42, 44, and 46 have a circular cross-sectional shape.

The bus bar is manufactured by various machining processes such as, for example, press processing and forging.

Other Configurations

The motor 1 may further include a phase bus bar and a bus bar holder. The bus bar holder is disposed above the insulator 120. Specifically, the bus bar holder is disposed above the neutral point bus bar 40. The bus bar holder holds the phase bus bar. The phase bus bar is electrically connected to the end of the withdrawn second lead wire 132.

Modified Example

In the above-described example embodiment, the bus bar having the axially stretched portions 41 and 47 extending downward in the axial direction has been described as an example, but a stretched portion of the present disclosure may extend upward in an axial direction.

In the present example embodiment, the structure in which the neutral point bus bar is positioned on the insulator has been described as an example, but a neutral point bus bar of the present disclosure may be positioned on another member of a stator. When a hole in which the stretched portion is disposed is formed in a conductive member of the stator, an insulation treatment process is performed. However, the bus bar holder is not included in the stator.

Further, in the present disclosure, a phase bus bar may be disposed in the hole of the stator instead of or in addition to the neutral point bus bar.

Electric Power Steering Apparatus

Figure 5:
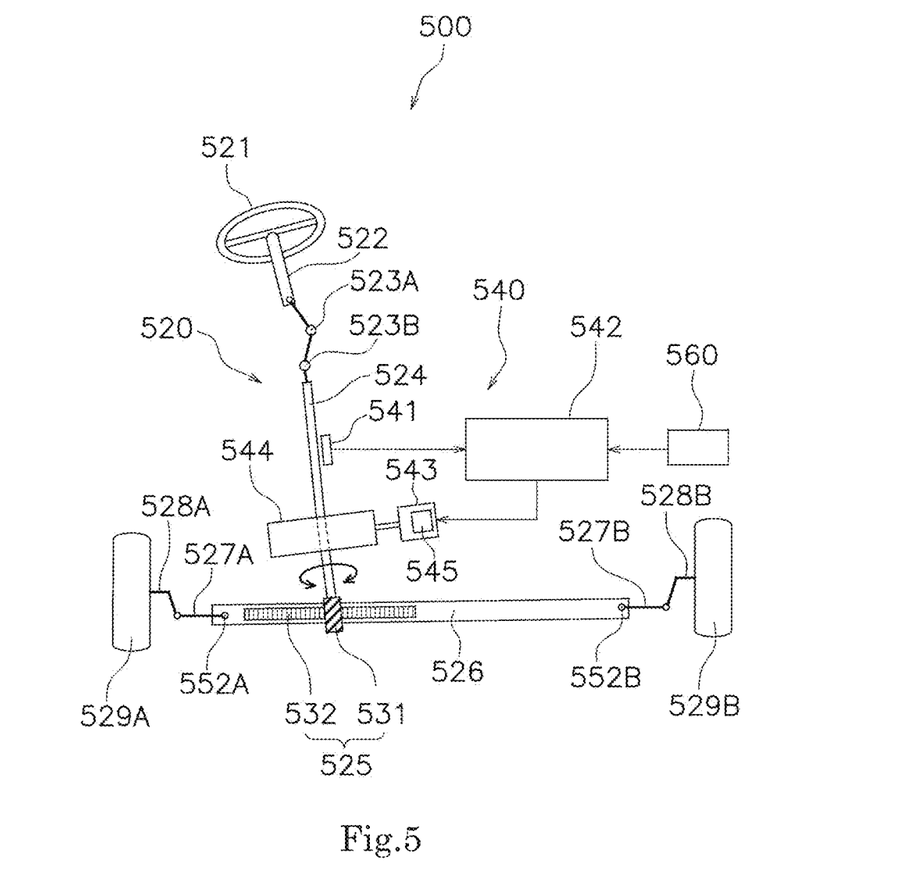
FIG. 5 is a schematic view of an electric power steering apparatus according to an example embodiment of the present disclosure.

An example in which the above-described motor 1 is mounted on an electric power steering apparatus 500 will be described with reference to FIG. 5.

Vehicles such as automobiles are generally provided with an electric power steering apparatus. The electric power steering apparatus generates auxiliary torque for assisting steering torque of a steering system generated when a driver operates a steering wheel. The auxiliary torque is generated by an auxiliary torque mechanism and may reduce the burden of the driver's operation. For example, the auxiliary torque mechanism includes a steering torque sensor, an electronic control unit (ECU), a motor, a reduction mechanism, and the like. The steering torque sensor detects the steering torque in the steering system. The ECU generates a driving signal on the basis of a detected signal of the steering torque sensor. The motor generates auxiliary torque corresponding to the steering torque on the basis of the driving signal and transmits the auxiliary torque to the steering system through the reduction mechanism.

The electric power steering apparatus 500 includes a steering system 520 and an auxiliary torque mechanism 540.

The steering system 520 includes, for example, a steering wheel 521, a steering shaft 522 (also referred to as a "steering column"), universal joint couplings 523A and 523B, a rotating shaft 524 (also referred to as a "pinion shaft" or "input shaft"), a rack and pinion mechanism 525, a rack shaft 526, left and right ball joints 552A and 552B, tie rods 527A and 527B, knuckles 528A and 528B, and right and left steered wheels (for example, right and left front wheels) 529A and 529B. The steering wheel 521 is connected to the rotating shaft 524 through the steering shaft 522 and the universal joint couplings 523A and 523B. The rack shaft 526 is connected to the rotating shaft 524 through the rack and pinion mechanism 525. The rack and pinion mechanism 525 includes a pinion 531 provided on the rotating shaft 524 and a rack 532 provided on the rack shaft 526. The right steered wheel 529A is connected to a right end of the rack shaft 526 through the ball joint 552A, the tie rod 527A, and the knuckle 528A in this order. Similar to the right side, the left steered wheel 529B is connected to a left end of the rack shaft 526 through the ball joint 552B, the tie rod 527B, and the knuckle 528B in this order. Here, the right side and the left side correspond to a right side and a left side viewed from a driver sitting in a seat, respectively.

According to the steering system 520, steering torque is generated when the driver operates the steering wheel 521, and is transmitted to the right and left steered wheels 529A and 529B through the rack and pinion mechanism 525. Thus, the driver may operate the right and left steered wheels 529A and 529B.

The auxiliary torque mechanism 540 includes, for example, a steering torque sensor 541, an ECU 542, a motor 543, a reduction mechanism 544, and a power conversion device 545. The motor 543 corresponds to the above-described motor 1.

The auxiliary torque mechanism 540 provides auxiliary torque to the steering system 520 including from the steering wheel 521 to the right and left steered wheels 529A and 529B. The auxiliary torque may be referred to as "additional torque".

The steering torque sensor 541 detects steering torque of the steering system 520 provided by the steering wheel 521. The ECU 542 generates a driving signal for driving the motor 543 on the basis of the detected signal (hereinafter referred to as a "torque signal") from the steering torque sensor 541. The motor 543 generates auxiliary torque corresponding to the steering torque on the basis of the driving signal. The auxiliary torque is transmitted to the rotating shaft 524 of the steering system 520 through the reduction mechanism 544. The reduction mechanism 544 is, for example, a worm gear mechanism. Further, the auxiliary torque is transmitted from the rotating shaft 524 to the rack and pinion mechanism 525.

The electric power steering apparatus 500 may be classified into a pinion assist type, a rack assist type, a column assist type, and the like according to the location in which the auxiliary torque is provided to the steering system 520. The pinion assist type electric power steering apparatus 500 is illustrated in FIG. 5. However, the electric power steering apparatus 500 may be a rack assist type, a column assist type, or the like.

For example, not only a torque signal but also a vehicle speed signal may be input to the ECU 542. An external device 560 is, for example, a vehicle speed sensor. Alternatively, the external device 560 may be another ECU capable of communicating in an in-vehicle network, for example, such as a controller area network (CAN) or the like. A microcontroller of the ECU 542 may perform vector control or pulse width modulation (PWM) control on the motor 543 on the basis of the torque signal, the vehicle speed signal, or the like.

The ECU 542 sets a target current value on the basis of at least the torque signal. The ECU 542 may set the target current value in consideration of the vehicle speed signal detected by the vehicle speed sensor, or a rotation signal of a rotor detected by an angle sensor. The ECU 542 may control the driving signal of the motor 543, that is, a driving current, such that the actual current value detected by a current sensor coincides with the target current value.

According to the electric power steering apparatus 500, the right and left steered wheels 529A and 529B may be operated by the rack shaft 526 using the combined torque obtained by adding the auxiliary torque of the motor 543 to steering torque of the driver. In particular, since the electric power steering apparatus 500 includes the above-described motor 1, the bus bar 40 may be easily positioned with respect to the stator 100.

Further, although the electric power steering apparatus 500 is described here as an example of a using method of the motor 1, the using method of the motor 1 is not limited. The motor of the present disclosure may be widely used in a variety of devices including various motors, such as a cleaner, a dryer, a ceiling fan, a washing machine, a refrigerator, and an electric power steering apparatus.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
 a rotor;
 a stator surrounding an outer side of the rotor in a radial direction and including a coil; and
 a bus bar of a wire electrically connected to the coil and having conductivity; wherein
 the stator is provided with a hole extending in an axial direction;
 the bus bar includes a stretched portion extending in the axial direction;
 the stretched portion is disposed in the hole;
 the stator includes a stator core and an insulator having an electrically insulating property and covering at least a portion of the stator core;
 the insulator includes a body portion and a flange portion;
 the flange portion protrudes in the radial direction from the body portion;
 an uppermost end surface of the flange portion is higher than an uppermost portion of the coil in the axial direction, the hole being defined in the flange portion; and
 the coil is defined by a portion of a coil wire which is wound around the stator core via the insulator.

2. The motor of claim 1, wherein
 the stator core includes a core back having an annular shape and a plurality of teeth extending inwardly in the radial direction from the core back.

3. The motor of claim 2, wherein the hole is located on an outer side of each of the teeth in the radial direction.

4. The motor of claim 2, wherein
 the stator core includes a split core that is split in a circumferential direction;
 the insulator includes a split body provided on each split core; and
 the hole is located in each of the split bodies.

5. The motor of claim 4, wherein two of the holes are provided in each of the split bodies.

6. The motor of claim 1, wherein
 the bus bar includes a coil connection portion connected to the coil; and
 the coil connection portion has a U-shape recessed outwardly or inwardly in the radial direction.

7. The motor of claim 6, wherein the coil connection portion is recessed inwardly in the radial direction.

8. The motor of claim 6, wherein the bus bar includes a plurality of the coil connection portions and the coil is defined by a plurality of the coil wires which are wound around the stator core via the insulator.

9. The motor of claim 1, wherein the bus bar is a neutral point bus bar.

10. The motor of claim 1, wherein a gap is located between the hole and the stretched portion.

11. The motor of claim 1, wherein a portion of the flange portion is directly radially outward from a portion of the coil.

12. The motor of claim 11, wherein a portion of the hole is directly radially outward from the portion of the coil.

13. An electric power steering apparatus comprising:
 a motor comprising:
 a rotor;
 a stator surrounding an outer side of the rotor in a radial direction and including a coil; and
 a bus bar of a wire electrically connected to the coil and having conductivity;
 wherein the stator is provided with a hole extending in an axial direction;
 the bus bar includes a stretched portion extending in the axial direction; and
 the stretched portion is disposed in the hole;
 the stator includes a stator core and an insulator having an electrically insulating property and covering at least a portion of the stator core;
 the insulator includes a body portion and a flange portion;
 the flange portion protrudes in the radial direction from the body portion;
 an uppermost end surface of the flange portion is higher than an uppermost portion of the coil in the axial direction, the hole being defined in the flange portion; and
 the coil is defined by a portion of a coil wire which is wound around the stator core via the insulator.

\* \* \* \* \*